US008583353B2

(12) United States Patent
Kosaka

(10) Patent No.: US 8,583,353 B2
(45) Date of Patent: Nov. 12, 2013

(54) TRAVELING APPARATUS AND CONTROL METHOD THEREFOR

(75) Inventor: Yusuke Kosaka, Chofu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 76 days.

(21) Appl. No.: 12/790,341

(22) Filed: May 28, 2010

(65) Prior Publication Data
US 2011/0060518 A1 Mar. 10, 2011

(30) Foreign Application Priority Data

Sep. 8, 2009 (JP) ................................. 2009-207105

(51) Int. Cl.
G06F 17/10 (2006.01)

(52) U.S. Cl.
USPC ... 701/124; 701/23; 280/5.507; 280/124.104; 280/124.106; 280/124.146; 280/146; 296/35.2; 14/69.5; 293/132; 74/493; 180/219

(58) Field of Classification Search
USPC .................. 701/23, 124; 280/5.507, 124.104, 280/124.106, 124.146, 274, 281, 288.1, 280/777; 296/35.2; 14/69.5; 293/132; 74/493; 180/219
See application file for complete search history.

(56) References Cited

U.S. PATENT DOCUMENTS

| 7,945,367 | B2 * | 5/2011 | Kosaka ............................ 701/70 |
| 8,011,459 | B2 * | 9/2011 | Serai et al. ...................... 180/8.2 |
| 8,014,923 | B2 * | 9/2011 | Ishii et al. ........................ 701/49 |
| 2008/0082252 | A1 | 4/2008 | Nishikawa |
| 2008/0147281 | A1 * | 6/2008 | Ishii et al. ........................ 701/49 |
| 2010/0030440 | A1 * | 2/2010 | Kosaka ............................ 701/70 |
| 2010/0030441 | A1 * | 2/2010 | Kosaka ............................ 701/70 |

FOREIGN PATENT DOCUMENTS

| JP | 2530652 | 6/1996 |
| JP | 2006-131115 | 5/2006 |
| JP | 2007-331443 | 12/2007 |
| JP | 4291732 | 4/2009 |
| WO | WO 2007/001083 A1 | 1/2007 |

OTHER PUBLICATIONS

Office Action issued Jul. 12, 2011, in Japanese Patent Application No. 2009-207105 with English translation.

* cited by examiner

Primary Examiner — McDieunel Marc
(74) Attorney, Agent, or Firm — Oblon, Spivak, McClelland, Maier & Neustadt, L.L.P.

(57) ABSTRACT

A traveling apparatus performs an inverted pendulum control to maintain an inverted state of a vehicle body and travels with a passenger thereon. The traveling apparatus includes a drive portion that drives the vehicle body; a riding detection portion that detects a start of riding on the vehicle body by the passenger; a command generation portion that generates a torque command value to perform the inverted pendulum control and a position control to move the vehicle body to a position that facilitates the riding, when the start of riding is detected by the riding detection portion; and a control portion that controls the drive portion based on the torque command value generated by the command generation portion.

7 Claims, 5 Drawing Sheets

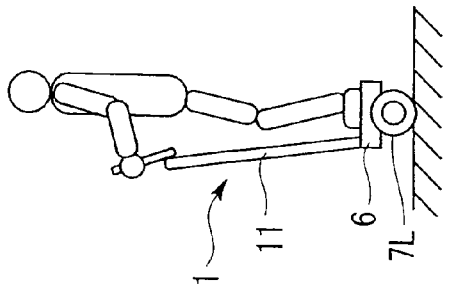
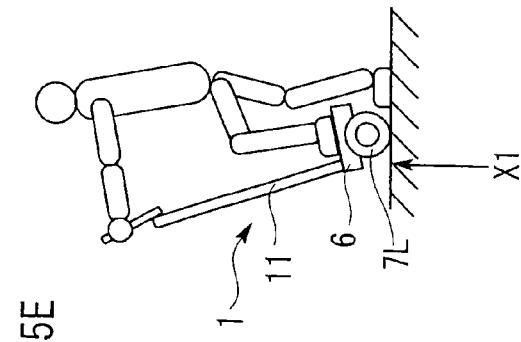
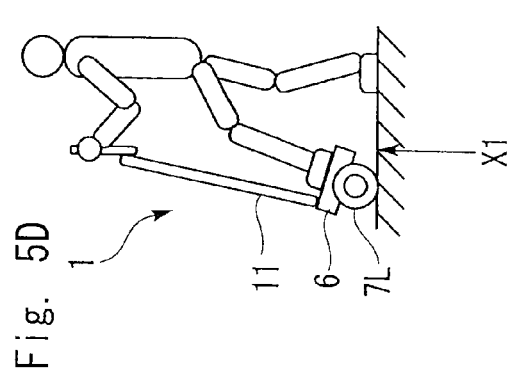
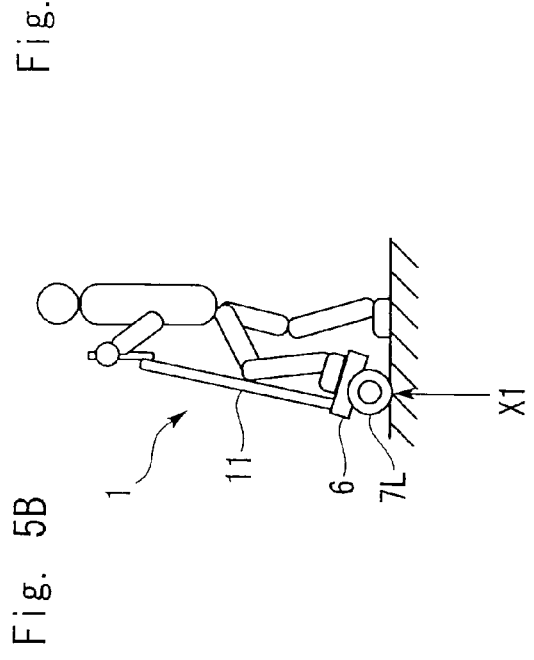
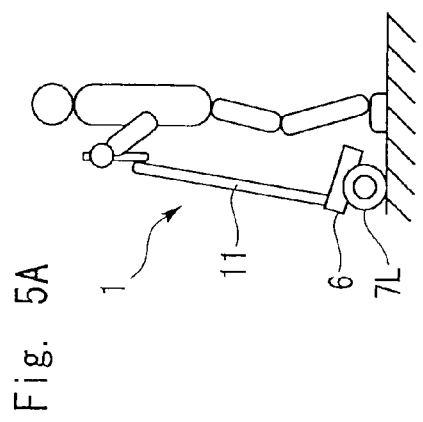

TRAVELING APPARATUS AND CONTROL METHOD THEREFOR

INCORPORATION BY REFERENCE

This application is based upon and claims the benefit of priority from Japanese patent application No. 2009-207105, filed on Sep. 8, 2009, the disclosure of which is incorporated herein in its entirety by reference.

BACKGROUND OF THE INVENTION

1. Field of the Invention

The present invention relates to a traveling apparatus that performs an inverted pendulum control to maintain an inverted state and travels with a passenger thereon, and control method therefor.

2. Description of Related Art

Recently, there is known a traveling apparatus in which traveling operation of a vehicle body can be performed by forward and backward movement or the like of the center of gravity of a passenger. Further, there is known a traveling apparatus that includes an empty-vehicle control means that performs an inverted pendulum control for a vehicle body to be independent with no passenger riding on the traveling apparatus (e.g., refer to Japanese Unexamined Patent Application Publication No. 2007-331443).

However, when a passenger rides on the vehicle body, the passenger operates a handle forward and backward, or inclines the vehicle body forward and backward without intention, so that in response to the movement, the vehicle body moves forward and backward. Therefore, it can become difficult for the passenger to ride on the vehicle body.

The present invention has been made to solve the above-mentioned problem, and therefore has a primary object to provide a traveling apparatus on which a passenger can safely and easily ride, and a control method therefor.

SUMMARY OF THE INVENTION

To achieve the above-mentioned object, according to a first exemplary aspect of the present invention, there is provided a traveling apparatus which performs an inverted pendulum control to maintain an inverted state of a vehicle body and travels with a passenger thereon, including: drive means that drives the vehicle body; riding detection means that detects a start of riding on the vehicle body by the passenger; command generation means that generates a torque command value to perform the inverted pendulum control and a position control to move the vehicle body to a position that facilitates the riding when the start of riding is detected by the riding detection means; and control means that controls the drive means based on the torque command value generated by the command generation means.

In the first exemplary aspect, the command generation means may generate the torque command value to perform the inverted pendulum control and the position control to return the vehicle body to a position where the passenger starts riding on the vehicle body, when the start of riding is detected by the riding detection means. Further, in the first exemplary aspect, the command generation means may generate the torque command value to perform the inverted pendulum control and the position control to maintain a predetermined distance between the vehicle body and the passenger when the start of riding is detected by the riding detection means. Furthermore, in the first exemplary aspect, the traveling apparatus may further include a posture sensor that detects an inclination angle of the vehicle body. The control means may control the vehicle body to move forward and backward according to the inclination angle of the vehicle body detected by the posture sensor, and perform the inverted pendulum control as well as control of the inclination angle of the vehicle body to move the vehicle body to the position that facilitates the riding when the start of riding is detected by the riding detection means.

Note that in the first exemplary aspect, the control means may suspend the position control and maintain the inverted pendulum control when the control means decides that the passenger completes riding on the vehicle body. Further, in the first exemplary aspect, the traveling apparatus may further include a pair of division steps on which both feet of the passenger can be placed, and a pair of step sensors that can detect a load on the division steps. The control means may set the position where the passenger start riding on the vehicle body based on the load detected by the step sensors.

Further, to achieve the above-mentioned object, according to a second exemplary aspect of the present invention, there is provided a control method for a traveling apparatus which performs an inverted pendulum control to maintain an inverted state of a vehicle body and travels with a passenger thereon, the method including: detecting a start of riding on the vehicle body by the passenger; generating a torque command value to perform the inverted pendulum control and a position control to move the vehicle body to a position that facilitates the riding, when the start of riding is detected; and controlling driving of the vehicle body based on the generated torque command value.

Furthermore, to achieve the above-mentioned object of the present invention, according to a third exemplary aspect of the present invention, there is provided a traveling apparatus which performs an inverted pendulum control to maintain an inverted state of a vehicle body and travels with a passenger thereon, including: wheel drive units that drive the vehicle body; a riding detection portion that detects a start of riding on the vehicle body by the passenger; a command generation portion that generates a torque command value to perform the inverted pendulum control and a position control to move the vehicle body to a position that facilitates the riding, when the start of riding is detected by the riding detection portion; and a control portion that controls the wheel drive units based on the torque command value generated by the command generation portion.

Moreover, to achieve the above-mentioned object of the present invention, according to a fourth exemplary aspect of the present invention, there is provided a storage medium which stores a control program for a traveling apparatus which performs an inverted pendulum control to maintain an inverted state of a vehicle body and travels with a passenger thereon, the control program causing a computer to execute processing including: detecting a start of riding on the vehicle body by the passenger; generating a torque command value to perform the inverted pendulum control and a position control to move the vehicle body to a position that facilitates the riding, when the start of riding is detected; and controlling driving of the vehicle body based on the generated torque command value.

According to exemplary aspects of the present invention, it is possible to provide a traveling apparatus on which a passenger can safely and easily ride, and a control method therefor.

The above and other objects, features and advantages of the present invention will become more fully understood from the detailed description given hereinbelow and the accompa-

BRIEF DESCRIPTION OF THE DRAWINGS

FIG. 5A is an exemplary state of a vehicle body according to an exemplary embodiment of the present invention;

FIG. 5B is an exemplary state of a vehicle body according to an exemplary embodiment of the present invention;

FIG. 5C is an exemplary state of a vehicle body according to an exemplary embodiment of the present invention;

FIG. 5D is an exemplary state of a vehicle body according to an exemplary embodiment of the present invention;

FIG. 5E is an exemplary state of a vehicle body according to an exemplary embodiment of the present invention; and FIG. 5F is an exemplary state of a vehicle body according to an exemplary embodiment of the present invention.

DESCRIPTION OF THE EXEMPLARY EMBODIMENTS

Figure 1:
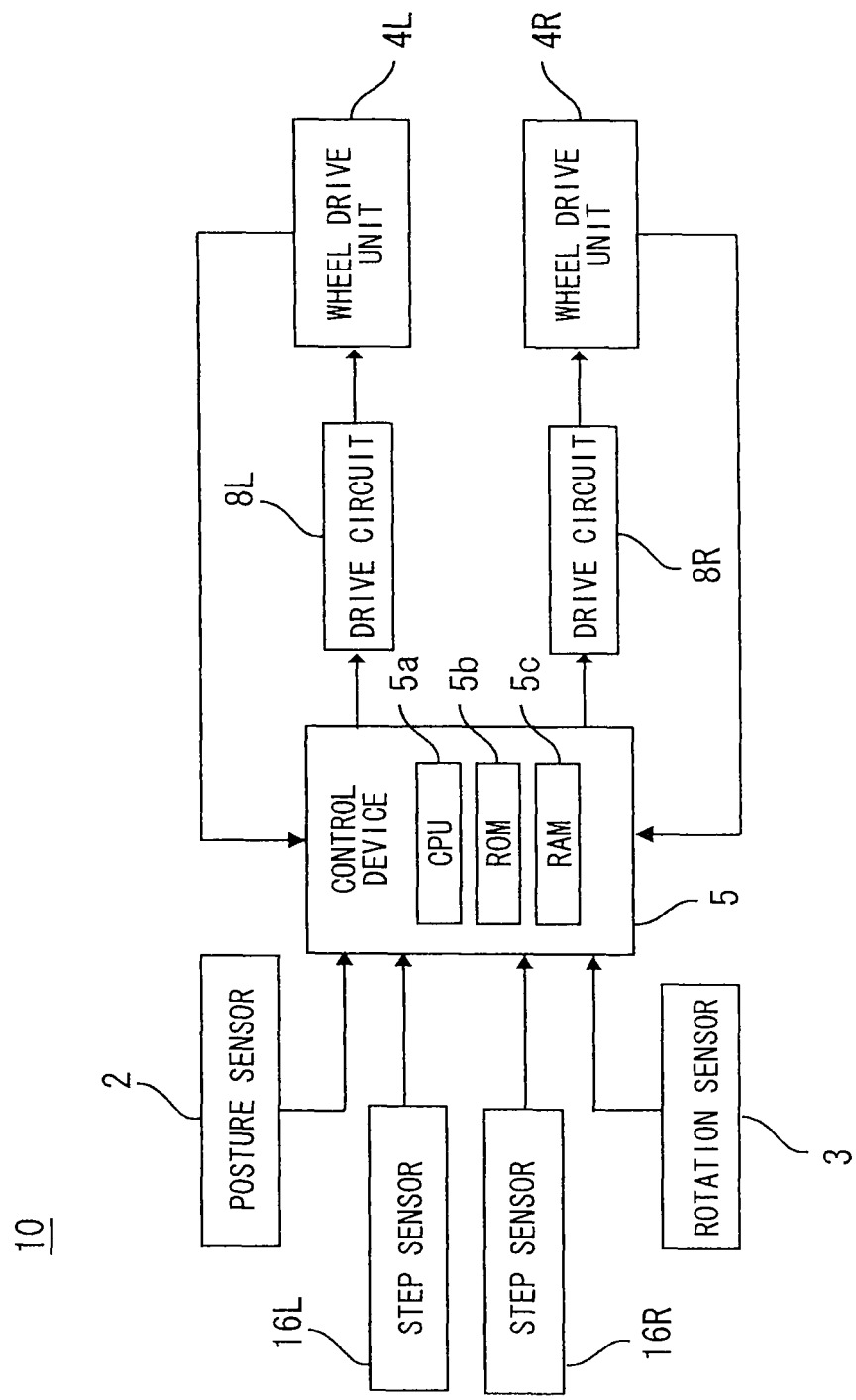
FIG. 1 is a block diagram showing a schematic system configuration of a traveling apparatus according to an exemplary embodiment of the present invention.
Figure 2:
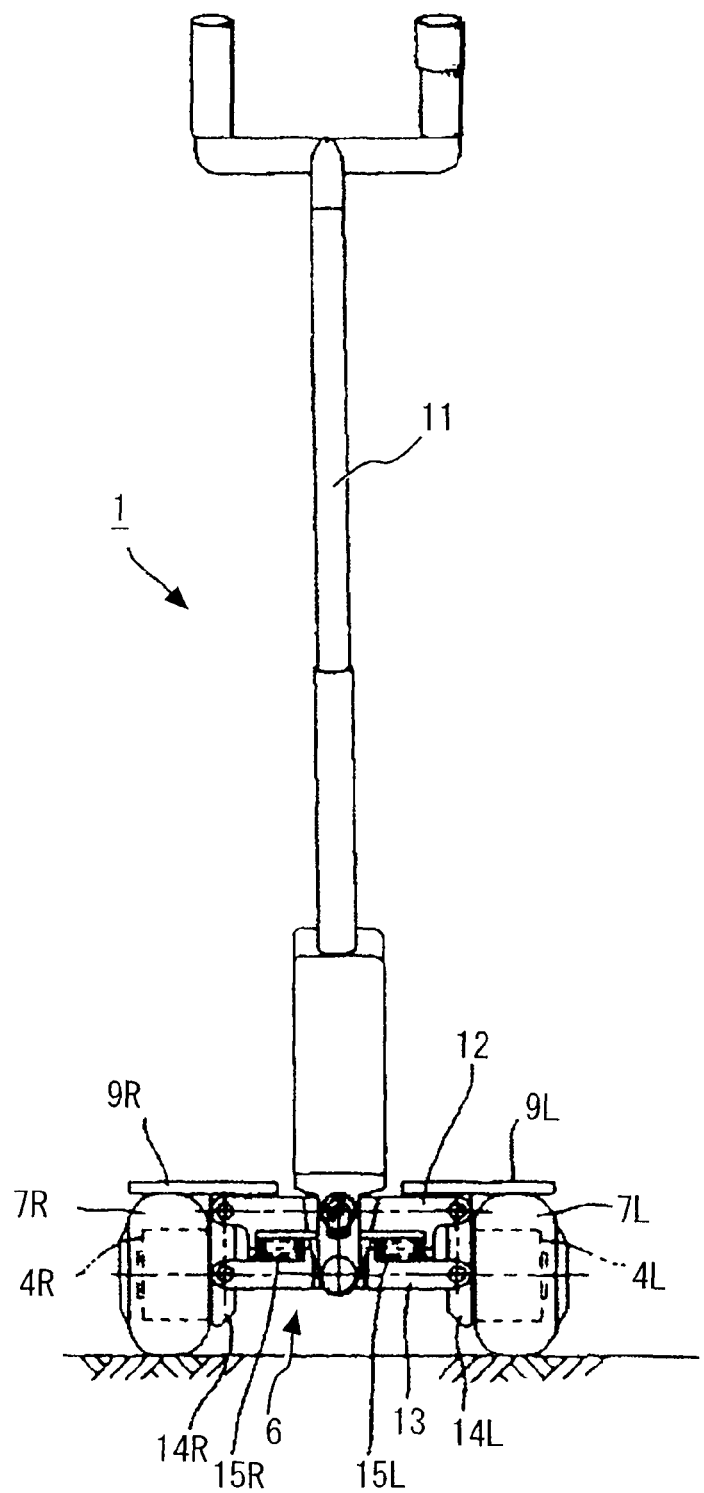
FIG. 2 is a front view showing a schematic configuration of the traveling apparatus according to an exemplary embodiment of the present invention.

Exemplary embodiments for carrying out the present invention will be described below with reference to the accompanying drawings. FIG. 1 is a block diagram showing a schematic system configuration of a traveling apparatus according to an exemplary of the present invention. FIG. 2 is a front view showing a schematic configuration of the traveling apparatus according to the present embodiment. A traveling apparatus 10 according to the present embodiment includes a posture sensor 2, a rotation sensor 3, a pair of wheel drive units 4L, 4R, a control device 5, and a pair of step sensors 16L, 16R which are provided in the vehicle body 1 shown in FIG. 2.

The vehicle body 1 is configured so that, for example, a passenger can ride standing on a chassis 6 as a coaxial two-wheel vehicle of a standing type. Further, the coaxial two-wheel vehicle is configured to, for example, move forward and backward by forward and backward movement of a center of gravity of the passenger, and turn left and right by left and right movement of a center of gravity of the passenger.

The posture sensor 2 detects posture information such as a pitch angle, a pitch angular velocity, a pitch angular acceleration, a roll angle, a roll angular velocity, and a roll angular acceleration of the chassis 6 of the vehicle body 1. The posture sensor 2 can detect, for example, the pitch angle (inclination angle) of the chassis 6 caused by forward and backward movement of the center of gravity of the passenger. The posture sensor 2 can also detect the roll angle (inclination angle) of division steps 9L, 9R of the chassis 6 caused by left and right movement of the center of gravity of the passenger.

The posture sensor 2 is connected to the control device 5. The posture sensor 2 outputs the detected posture information to the control device 5. Note that the posture sensor 2 includes, for example, a gyroscopic sensor, an acceleration sensor, and an angular sensor. A pitch axis is an axis corresponding to an axle of a pair of wheels 7L, 7R. A roll axis is an axis which passes through the center of the chassis 6 and is parallel to the traveling direction of the vehicle body 1.

The rotation sensor 3 detects rotation information such as a rotation angle, a rotation velocity, and a rotation acceleration of the wheels 7L, 7R provided at the vehicle body 1. The rotation sensor 3 is connected to the control device 5. The rotation sensor 3 outputs the detected rotation information to the control device 5.

The pair of wheel drive units 4L, 4R are a concrete example of drive means, and allow the vehicle body 1 to travel by driving the pair of wheels 7L, 7R which are rotatably provided at the vehicle body 1. Each of the wheel drive units 4L, 4R includes, for example, an electrical motor, and a reduction gear. The reduction gear is coupled to the rotation axis of the electrical motor, and can transmit the power of the electrical motor to the wheels 7L, 7R. Each of the wheel drive units 4L, 4R is connected to the control device 5 through drive circuits 8L, 8R. The wheel drive units 4L, 4R drive the wheels 7L, 7R, respectively, in response to a control signal from the control device 5.

The control device 5 controls the rotation of each of the wheels 7L, 7R by controlling each of the wheel drive units 4L, 4R so that the vehicle body 1 performs the desired traveling (moving forward, moving backward, accelerating, decelerating, stopping, turning left, turning right, or the like) under the inverted pendulum control to maintain the inverted state. Further, the control device 5 performs the well-known control such as a feedback control or a robust control, based on the posture information of the vehicle body 1 detected by the posture sensor 2 and the rotation information of each of the wheels 7L, 7R detected by the rotation sensor 3.

For example, the control device 5 moves the vehicle body 1 forward and backward by controlling the rotation of each of the wheels 7L, 7R through each of the wheel drive units 4L, 4R, according to the pitch angle of the chassis 6 detected by the posture sensor 2 when the passenger moves the center of gravity forward and backward. Further, the control device 5 allows the vehicle body 1 to turn left and right by controlling each of the wheel drive units 4L, 4R to produce the rotational difference between the left and right wheels 7L, 7R, according to the roll angle of the division steps 9L, 9R of the chassis 6 detected by the posture sensor 2 when the passenger moves the center of gravity left and right.

Furthermore, the control device 5 calculates, for example, rotation torque of each of the wheels 7L, 7R by multiplying the pitch angle of the chassis 6 detected by the posture sensor 2 by a predetermined control gain. Then, the control device 5 controls each of the wheel drive units 4L, 4R so that the calculated rotation torque occurs in each of the wheels 7L, 7R. As a result, the control device 5 performs the inverted pendulum control so that the center of gravity of the vehicle body 1 returns onto the vertical line which passes though the axle of each of the wheels 7L, 7R, by rotating each of the wheels 7L, 7R in a direction in which the chassis 6 is inclined. Further, the control device 5 can maintain the inverted state in which the pitch angle does not exceed a certain value by adding the adequate rotation torque to each of the wheels 7L, 7R, and control the movement of the vehicle body 1 such as moving forward, moving backward, stopping, decelerating, accelerating, turning left, or turning right, according to the posture angle from the posture sensor 2.

The above-mentioned configuration of the vehicle control allows the vehicle body 1 to move forward and backward by movement of the center of gravity of the passenger forward and backward to incline the chassis 6 forward and backward, and allows the vehicle body 1 to turn left and right by movement of the center of gravity of the passenger left and right to incline the chassis 6 left and right, for example.

Note that the control device 5 may be implemented by hardware with a microcomputer as a center, for example, and the microcomputer includes a CPU (Central Processing Unit) 5a for performing control processing, arithmetic processing, or the like, a ROM (Read Only Memory) 5b for storing a control program, a calculation program, or the like executed by the CPU 5a, and a RAM (Random Access Memory) 5c for temporarily storing processed data or the like.

The step sensors 16L, 16R are respectively provided at the pair of division steps 9L, 9R. Each of the step sensors 16L, 16R includes a load sensor which can detect the load of the passenger on each of the division steps 9L, 9R. Each of step sensors 16L, 16R outputs the detected load to the control device 5. The control device 5 can detect a state in which only one foot of the passenger is placed on one of the division steps 9L, 9R, a state in which both feet of the passenger are placed on the pair of division steps 9L, 9R, and a state in which neither foot of the passenger is placed on the division steps 9L, 9R.

The vehicle body 1 is, as shown in FIG. 2, configured as a coaxial two-wheel vehicle. The vehicle body 1 includes the chassis 6, the wheels 7L, 7R, the division steps 9L, 9R, and a handle 11. The pair of left and right division steps 9L, 9R are one example of step plates on which the passenger gets. The chassis 6 supports each of the division steps 9L, 9R in such a manner as to allow the posture thereof to be changed in a roll direction. The pair of left and right wheels 7L, 7R are rotatably supported by the chassis 6. The handle 11 is an operation lever to alter the posture of each of the division steps 9L, 9R in a roll direction through the chassis 6.

The division steps 9L, 9R on which the feet of the passenger are respectively placed, is composed of a pair of flat plate bodies. Each of the plate bodies is formed in approximately the same size as the foot of a human or formed in a little larger size than the foot of a human. The chassis 6 is constructed as a parallel link mechanism which includes a vehicle body upper member 12, a vehicle body lower member 13, and a pair of side members 14L, 14R. The vehicle body upper member 12 and the vehicle body lower member 13 are arranged vertically and in parallel to each other. The pair of side members 14L, 14R are arranged horizontally, in parallel to each other, and rotatably coupled to the vehicle body upper member 12 and the vehicle body lower member 13.

A pair of coil springs 15L, 15R are interposed between the vehicle body upper member 12 and the vehicle body lower member 13 of the parallel link mechanism. The pair of coil springs 15L, 15R produce a spring force so that the angle between each of the vehicle body upper member 12 and the vehicle body lower member 13, and each of the pair of side members 14L, 14R is maintained at a right angle. Further, the wheel drive units 4L, 4R are respectively mounted on the outer faces of the pair of side members 14L, 14R. Thus, when the pair of wheels 7L, 7R supported by the pair of side members 14L, 14R through the pair of wheel drive units 4L, 4R are placed on a flat road surface, the rotation centers of the pair of wheels 7L, 7R coincide with each other on the same axis line. Note that the vehicle body 1 is structured as a coaxial two-wheel vehicle, however, the structure of the vehicle body 1 is not limited thereto. For example, the vehicle body 1 is applicable to an arbitrary vehicle which is operated by the movement of the center of gravity of a passenger and performs the inverted pendulum control.

Now then, when a passenger rides on the vehicle body, for example, the passenger operates a handle forward and backward, or inclines the vehicle body forward and backward without intention so that, in a response to the movement, the vehicle body moves forward and backward. Consequently, it can be difficult for the passenger to ride on the vehicle body.

Therefore, when the control device 5 according to the present embodiment detects a start of riding on the vehicle body 1 by the passenger, the control device 5 performs the inverted pendulum control and a position control to continually return the vehicle body 1 to a position where the passenger can safely and easily ride on the vehicle body 1. The position is, for example, a position X1 where the passenger starts riding on the vehicle body 1 (the position X1 is hereinafter referred to as "riding start position X1").

Accordingly, when the passenger, for example, rides on the vehicle body 1, the passenger operates the handle 11 forward and backward, or inclines the vehicle body 1 forward and backward so that, in response to the movement, the vehicle body 1 moves forward and backward. Even if such a case occurs, the vehicle body 1 can be returned to the riding start position X1 by the above-mentioned position control. As a result, a space between the vehicle body 1 and the passenger is suitably maintained when the passenger rides on the vehicle body 1. Therefore, the passenger can safely and easily ride on the vehicle body 1.

Figure 3:
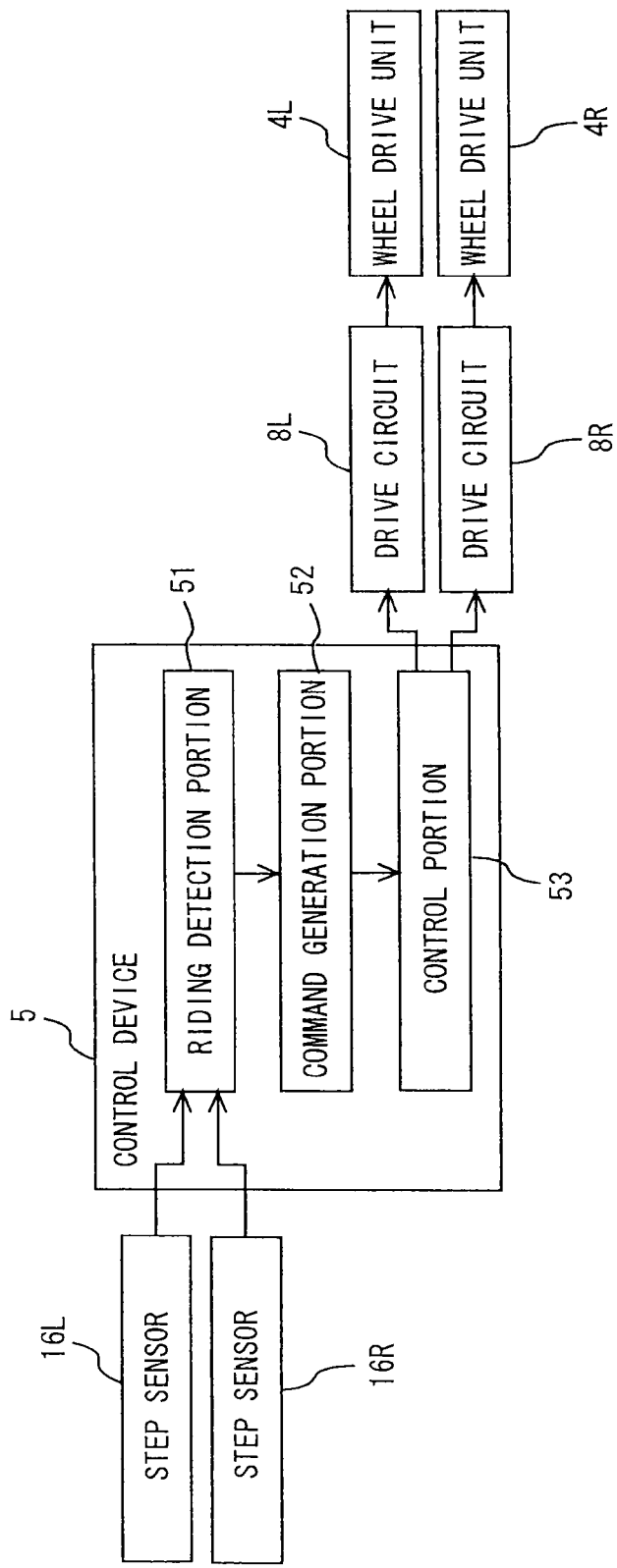
FIG. 3 is a block diagram showing a schematic system configuration of a control device according to an exemplary embodiment of the present invention.

FIG. 3 is a block diagram showing a schematic system configuration of a control device. The control device 5 includes a riding detection portion 51, a command generation portion 52, and a control portion 53. The riding detection portion 51 detects the start of riding on the vehicle body 1 by the passenger. The command generation portion 52 generates a torque command value. The control portion 53 controls each of the wheel drive units 4L, 4R based on the torque command value generated by the command generation portion 52.

The riding detection portion 51 detects the start of riding on the vehicle body 1 by the passenger, by detecting, for example, the state in which only one foot of the passenger gets on one of the division steps 9L, 9R based on the load detected by each of the step sensors 16L, 16R. When the riding detection portion 51 detects the start of the passenger riding on the vehicle body 1, the riding detection portion 51 outputs a start signal to the command generation portion 52.

Further, the riding detection portion 51 detects the completion of riding on the vehicle body 1 by the passenger, by detecting, for example, the state in which both feet of the passenger are respectively placed on the pair of division steps 9L, 9R based on the load detected by each of the step sensors 16L, 16R. When the riding detection portion 51 detects the completion of riding on the vehicle body 1 by the passenger, the riding detection portion 51 outputs a completion signal to the command generation portion 52.

The command generation portion 52 generates the torque command value to control each of the wheel drive units 4L, 4R, and outputs the generated torque command value to the control portion 53. Further, when the command generation portion 52 receives the start signal from the riding detection portion 51, the command generation portion 52 generates the torque command value to perform the inverted pendulum control and continually return the vehicle body 1 to the riding start position X1 obtained when the start signal is received.

Herein, the command generation portion 52 calculates the torque command value by using, for example, the following expression (1). Note that in the following expression (1), $\beta$ denotes the pitch angle of the chassis 6 detected by the posture sensor 2, $\beta'$ denotes the pitch angular velocity, x denotes the vehicle position of the vehicle body 1, x' denotes the velocity of the vehicle body 1, $K_{pp}$ denotes a pitch angle gain, $K_{pd}$ denotes a pitch angular velocity gain, $K_{px}$ denotes a vehicle position gain, and $K_{dx}$ denotes a velocity gain. Further, the parameters to which a subscript r is attached denote the command values, while the parameters to which the subscript r is not attached denote the detected values. Furthermore, $\beta_r'$ is equal to 0, $x_r$ denotes the riding start position X1 where the passenger starts the riding motion, and $x_r'$ is equal to 0.

The torque command value=$K_{pp}(\beta_r-\beta)+K_{dp}(\beta_r'-\beta')+K_{px}(x_r-x)+K_{dx}(x_r'-x')$  (1)

Note that the command generation portion 52 can calculate the vehicle position x and velocity x' of the vehicle body 1 based on the rotation information of the wheels 7L, 7R detected by the rotation sensor 3.

Furthermore, when the command generation portion 52 receives the completion signal from the riding detection portion 51, the command generation portion 52 suspends the position control and generates the torque command value to maintain the inverted pendulum control. Herein, the command generation portion 52 generates the torque command value by using, for example, the following expression (2). Further, the command generation portion 52, for example, generates the torque command value to suspend a turning control and to perform the only forward/backward movement control until the command generation portion 52 receives the completion signal from the riding detection portion 51 and the passenger completes riding, in view of safety and ride performance.

The torque command value=$K_{pp}(\beta_r-\beta)+K_{dp}(\beta_r'-\beta')$  (2)

The control portion 52 controls each of the wheel drive units 4L, 4R and controls driving of each of the wheels 7L, 7R, by sending a control signal to each of the wheel drive units 4L, 4R, according to the torque command value generated by the command generation portion 52.

Figure 4:
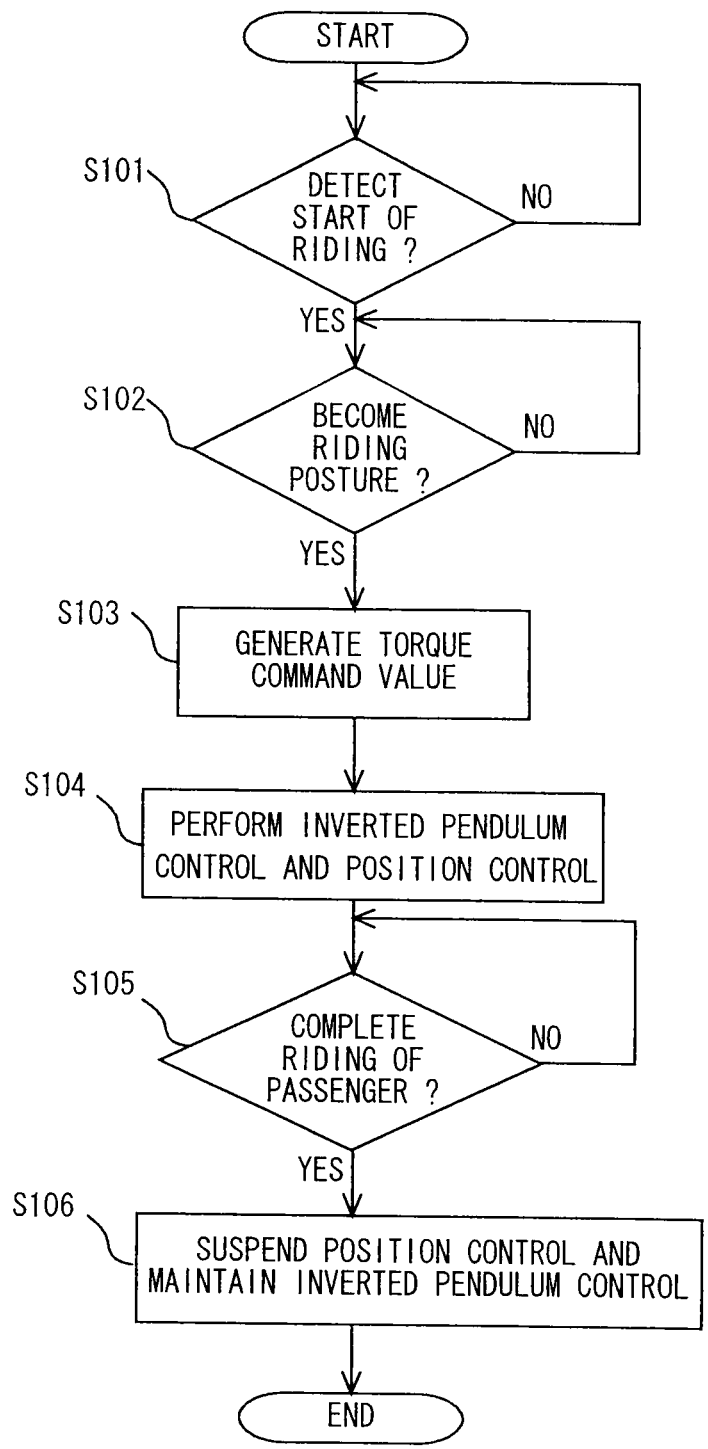
FIG. 4 is a flowchart showing an exemplary control processing flow of the traveling apparatus according to an exemplary embodiment of the present invention.

Next, a control method for the traveling apparatus 10 according to the present embodiment is explained in detail. FIG. 4 is a flowchart showing an exemplary control processing flow of the traveling apparatus according to the present embodiment.

When the passenger starts riding on the vehicle body 1, the passenger, as shown in FIG. 5B, places one foot on one of the division steps 9L, 9R, from the state in which the passenger, as shown in FIG. 5A, grips the handle 11 and holds the vehicle body 1. At that time, the riding detection portion 51 detects the state in which only one foot of the passenger is placed on one of the division steps 9L, 9R, and detects the start of riding on the vehicle body 1 by the passenger, based on the load detected by each of the step sensors 16L, 16R (step S101).

When the riding detection portion 51 detects the start of riding on the vehicle body 1 by the passenger (YES in step S101), and decides that, as shown in FIG. 5C, the chassis 6 becomes the riding posture in which the chassis 6 is in a horizontal state (YES in step S102), the riding detection portion 51 outputs the start signal to the command generation portion 52. Note that when the riding detection portion 51 detects the start of riding on the vehicle body 1 by the passenger, the riding detection portion 51 may directly output the start signal to the command generation portion 52 without deciding the above-mentioned riding posture.

The command generation portion 52 generates the torque command value by using the aforementioned expression (1) (step S103), and outputs the generated torque command value to the control portion 53. The control portion 53 performs the inverted pendulum control and the position control to continually return the vehicle body 1 to the riding start position X1 through each of the wheel drive units 4L, 4R, based on the torque command value generated by the command generation portion 52 (step S104).

For example, as shown in FIG. 5D, when the vehicle position of the vehicle body 1 moves in front of the riding start position X1 and the vehicle body 1 is away from the passenger, the control portion 53 controls each of the wheel drive units 4L, 4R for the vehicle body 1 to approach the passenger, by moving the vehicle body 1 backward to return the vehicle body 1 to the riding start position X1. Consequently, the passenger can safely and easily ride on the chassis 6 in comfortable posture.

Meanwhile, as shown in FIG. 5E, when the vehicle position of the vehicle body 1 moves behind the riding start position X1 and the vehicle body 1 comes closer to the passenger, the control portion 53 controls each of the wheel drive units 4L, 4R to cause the vehicle body 1 to move a little away from the passenger, by moving the vehicle body 1 forward to return the vehicle body 1 to the riding start position X1. Consequently, the passenger can maintain an adequate distance from the chassis 6, and safely and easily ride on the chassis 6.

The riding detection portion 51 detects, as shown in FIG. 5F, the completion of riding on the vehicle body 1 by the passenger, by detecting the state in which the both feet of the passenger are respectively placed on the pair of division steps 9L, 9R based on the load detected by each of the step sensors 16L, 16R (step S105). When the riding detection portion 51 detects the completion of riding on the vehicle body 1 by the passenger (YES in step S105), the riding detection portion outputs the completion signal to the command generation portion 52.

When the command generation portion 52 receives the completion signal from the riding detection portion 51, the command generation portion 52 generates the torque command value by using the aforementioned expression (2), and outputs the torque command value to the control portion 53. The control portion 53 controls each of the wheel drive units 4L, 4R to suspend the position control and maintain the inverted pendulum control, based on the torque command value generated by the command generation portion 52 (step S106).

As stated above, in the traveling apparatus 10 according to the present embodiment, when the control device 5 detects the start of riding on the vehicle body 1 by the passenger, the control device 5 performs the inverted pendulum control and the position control to continually return the vehicle body 1 to the riding start position X1. Consequently, even when the vehicle body 1 gets out of position due to unintentional traveling operations or the like of the passenger, the vehicle body 1 can be returned to the riding start position X1 where the passenger can safely and easily ride by the aforementioned position control. Therefore, the passenger can safely and easily ride on the vehicle body 1.

Note that the present invention is not limited to the above exemplary embodiments and can be modified in various manners without departing from the scope of the present invention. For example, while, in the above exemplary embodiment, the command generation portion 52 generates the torque command value to continually return the vehicle body 1 to the riding start position X1, the present invention is not limited thereto. The command generation portion 52 may generate the torque command value corresponding to the pitch angle (target posture) of the chassis 6 to return the vehicle body 1 to the position where the passenger can safely and easily ride.

For example, as shown in FIG. 5D, when the vehicle position of the vehicle body 1 moves in front of the riding start position X1 and the distance between the passenger and the vehicle body 1 becomes large, the command generation portion 52 generates the torque command value to incline the chassis 6 backward according to the distance. Then, the control portion 53 controls the vehicle body 1 to move backward to return the vehicle body 1 to the riding start position X1 and approaches the vehicle body 1 to the passenger, based on the pitch angle corresponding to the backward inclination of the chassis 6 detected by the posture sensor 2.

On the other, as shown in FIG. 5E, when the vehicle position of the vehicle body 1 moves behind the riding start position X1 and the distance between the passenger and the vehicle body 1 becomes small, the command generation portion 52 generates the torque command value to incline the chassis 6 forward according to the distance. Then, the control portion 53 controls the vehicle body 1 to move forward to return the vehicle body 1 to the riding start position X1 and causes the vehicle body 1 to move away from the passenger, based on the pitch angle corresponding to the forward inclination of the chassis 6 detected by the posture sensor 2.

Note that the command generation portion 52 calculates the torque command value by using the aforementioned expression (2). At that time, in the case where an expression $x_r \leq x$ is applied, an expression $\beta_r = K_{xf}(x_r - x)$ is applied. In case where an expression $x_r > x$ is applied, an expression $\beta_r = K_{xb}(x_r - x)$ is applied. Further, $K_{xf}$ denotes a frontside position error conversion coefficient, and $K_{xb}$ denotes a backside position error conversion coefficient.

When the command generation portion 52 receives the completion signal from the riding detection portion 51, the command generation portion 52 generates the torque command value corresponding to the pitch angle at the start of riding, and outputs the torque command value to the control portion 53.

Further, while, in the above exemplary embodiment, when the command generation portion 52 receives the start signal from the riding detection portion 51, the command generation portion 52 generates the torque command value to perform the inverted pendulum control and continually return the vehicle body 1 to the riding start position X1, the present invention is not limited thereto. The command generation portion 52 may generate the torque command value to perform the inverted pendulum control and maintain a predetermined distance between the chassis 6 and the passenger. Note that the distance between the chassis 6 and the passenger (e.g., a landing foot, or a body) can be detected by a distance sensor (e.g., a camera, an ultra-sonic sensor, or a radar sensor) provided at the chassis 6, or the like. Consequently, when the passenger gets on the chassis 6 of the vehicle body 1, the distance between the chassis 6 and the passenger can be maintained the predetermined distance suitable for the riding. Therefore, the passenger can safely and easily ride on the vehicle body 1.

Furthermore, while, in the above exemplary embodiment, the control portion 53 performs the position control to return the vehicle body 1 to the riding start position X1 by moving the vehicle body 1 forward and backward, the present invention is not limited thereto. The control portion 53 may perform the position control to return the vehicle body 1 to the riding start position X1 by turning the vehicle body 1 left and right, and may perform the position control to return the vehicle body 1 to the riding start position X1 by moving the vehicle body 1 forward and backward as well as turning the vehicle body 1 left and right.

While, in the above exemplary embodiment, the description has been made of an example where the present invention is implemented by hardware, the present invention is not limited thereto. The present invention can also be implemented by causing the CPU 5a to execute the processing shown in FIG. 4 as a computer program. In this case, the computer program can be stored and provided to a computer using any type of non-transitory computer readable media. Non-transitory computer readable media include any type of tangible storage media. Examples of non-transitory computer readable media include magnetic storage media (floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus which performs an inverted pendulum control to maintain an inverted state of a vehicle body and travels with a passenger thereon, comprising:
   drive means that drives the vehicle body;
   riding detection means that detects a start of riding on the vehicle body by the passenger;
   command generation means that generates a torque command value to perform the inverted pendulum control and a position control to return the vehicle body to a position on a travel surface where the passenger started riding on the vehicle body when the start of riding was detected by the riding detection means; and
   control means that controls the drive means based on the torque command value generated by the command generation means.

2. A traveling apparatus according to claim 1, wherein the command generation means generates the torque command value to perform the inverted pendulum control and the position control to maintain a predetermined distance between the vehicle body and the passenger when the start of riding is detected by the riding detection means.

3. A traveling apparatus according to claim 1, further comprising a posture sensor that detects an inclination angle of the vehicle body,
   wherein the control means controls the vehicle body to move forward and backward according to the inclination angle of the vehicle body detected by the posture sensor, and performs the inverted pendulum control as well as control of the inclination angle of the vehicle body to move the vehicle body to the position on the travel surface where the passenger started riding on the vehicle body, when the start of riding was detected by the riding detection means.

4. A traveling apparatus according to claim 1, wherein the control means suspends the position control and maintains the inverted pendulum control when the control means decides that the passenger completes riding on the vehicle body.

5. A traveling apparatus according to claim 1, further comprising a pair of division steps on which both feet of the passenger can be placed, and a pair of step sensors that can detect a load on the division steps,
   wherein the control means sets the position where the passenger starts riding on the vehicle body, based on the load detected by the step sensors.

6. A control method for a traveling apparatus which performs an inverted pendulum control to maintain an inverted state of a vehicle body and travels with a passenger thereon, the method comprising:
   detecting by a hardware processor a start of riding on the vehicle body by the passenger;
   generating a torque command value to perform the inverted pendulum control and a position control to return the vehicle body to a position on a travel surface where the passenger started riding on the vehicle body, when the start of riding was detected; and
   controlling driving of the vehicle body by the hardware processor based on the generated torque command value.

7. A traveling apparatus which performs an inverted pendulum control to maintain an inverted state of a vehicle body and travels with a passenger thereon, comprising:
   wheel drive units that drive the vehicle body;
   a riding detection portion that detects a start of riding on the vehicle body by the passenger;
   a command generation portion that generates a torque command value to perform the inverted pendulum control and a position control to return the vehicle body to a position on a travel surface where the passenger started riding on the vehicle body, when the start of riding was detected by the riding detection portion; and
   a control portion that controls the wheel drive units based on the torque command value generated by the command generation portion.

* * * * *